(12) United States Patent
Yamasaki (10) Patent No.: US 7,019,807 B2
(45) Date of Patent: Mar. 28, 2006

(54) ELECTROOPTIC DEVICE AND ELECTRONIC EQUIPMENT

(75) Inventor: Yasuji Yamasaki, Chin (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/652,516

(22) Filed: Sep. 2, 2003

(65) Prior Publication Data

US 2004/0046902 A1    Mar. 11, 2004

(30) Foreign Application Priority Data

Sep. 11, 2002    (JP) .............................. 2002-265749

(51) Int. Cl.
*G02F 1/1333* (2006.01)

(52) U.S. Cl. ................... 349/138; 349/110; 349/111

(58) Field of Classification Search ................ 349/43, 349/110–111, 138, 38
See application file for complete search history.

(56) References Cited

U.S. PATENT DOCUMENTS

| | | | | |
|---|---|---|---|---|
| 6,118,505 A * | 9/2000 | Nagata et al. | ............... | 349/106 |
| 6,400,426 B1 * | 6/2002 | Yamazaki et al. | ............. | 349/43 |
| 6,531,713 B1 * | 3/2003 | Yamazuki | .................... | 257/59 |
| 6,583,830 B1 * | 6/2003 | Yasukawa et al. | ............. | 349/43 |
| 6,605,827 B1 * | 8/2003 | Katayama | .................... | 257/72 |
| 6,830,484 B1 * | 12/2004 | Lee | ............................. | 439/640 |
| 6,846,688 B1 * | 1/2005 | Nishiki et al. | ................ | 438/30 |
| 2002/0057403 A1 * | 5/2002 | Yasukawa et al. | .......... | 349/110 |

FOREIGN PATENT DOCUMENTS

| | | |
|---|---|---|
| JP | A-09-197439 | 7/1997 |
| JP | A-09-236825 | 9/1997 |
| JP | A-10-048610 | 2/1998 |
| JP | A 2001-188253 | 7/2001 |
| JP | A-2001-305580 | 10/2001 |
| JP | A-2002-123192 | 4/2002 |
| JP | A-2002-244155 | 8/2002 |

\* cited by examiner

*Primary Examiner*—Dung T. Nguyen
*Assistant Examiner*—Phu Vu
(74) *Attorney, Agent, or Firm*—Oliff & Berridge, PLC (57) ABSTRACT

The present invention provides an electro-optic device that displays high-quality images without irregular display along data lines arising from variations in the potential of pixel electrodes by energization to the data lines in an electro-optic device. The electro-optic device can have a multilayer structure including a substrate, TFTs, scanning lines, storage capacitance, data lines, and pixel electrodes, each of which is arranged on the substrate in this order. In this electro-optic device, a third interlayer insulator positioned between the data lines and the pixel electrodes has a relative dielectric constant lower than that of a dielectric film constituting the storage capacitance. The third interlayer insulator preferably has a relative dielectric constant lower than those of first and second interlayer insulators.

11 Claims, 9 Drawing Sheets

ELECTROOPTIC DEVICE AND ELECTRONIC EQUIPMENT

BACKGROUND OF THE INVENTION

1. Field of Invention

The present invention relates to liquid crystal devices and other electro-optic devices and electronic equipment comprising the electro-optic device. The present invention also relates to the technical fields of electronic paper and other electrophoresis devices.

2. Description of Related Art

Certain liquid crystal devices and other electro-optic devices can be driven in an active matrix driving system. These devices each can include pixel electrodes arranged in a matrix, thin film transistors (TFTs) connected to each of the electrodes, scanning lines and data lines connected to each of the TFTs and arranged in parallel line-wise and column-wise, respectively. A scanning line driving circuit drives the scanning lines, and a data line driving circuit drives the data lines to thereby achieve active matrix driving.

The active matrix driving is a driving system in which a scanning signal is supplied to the scanning line to thereby control the operations of the TFT, and a picture signal is supplied to the data line to thereby apply an electric field corresponding to the picture signal with respect to a pixel electrode corresponding to a TFT which is turned ON by action of the scanning signal. As the supply process of the picture signal, various processes have been proposed, such as a process of sequentially supplying picture signals to each of the data lines, and a process of converting a serial picture signal into parallel picture signals and supplying the picture signals concurrently to several adjacent data lines as a group. Such a system is described, for example, in Japanese Unexamined Patent Application Publication No. 2001-188253.

SUMMARY OF THE INVENTION

However, such conventional processes for supplying picture signals through data lines have the following problems. The process of concurrently supplying the picture signal to plural data lines as a group is taken as example herein among the above-exemplified supply processes of picture signals. In this process, images are irregularly displayed substantially along a data line extending between a group to which the picture signal is actually supplied (hereinafter referred to as a supplied group) and another group adjacent to the supplied group (hereinafter referred to as a non-supplied group).

This is because an electric field accurately corresponding to the picture signal is not applied consequently in a pixel electrode at the boundary between the supplied group and the non-supplied group. More specifically, the pixel electrode in this case is in contact with, at one end thereof, a data line to which the picture signal is supplied, and at the other end, a data line to which the picture signal is not supplied. Even if an accurate electric field corresponding to the picture signal is applied to the pixel electrode, the capacitive coupling between the pixel electrode and the data line to which the picture signal is not supplied affects so as to vary its potential.

As a possible solution to these problems, an attempt has been made to increase the thickness of an interlayer insulator positioned between a pixel electrode and a data line to thereby decrease capacitive coupling between the pixel electrode and the data line. However, if an interlayer insulator has an increased thickness, for example, a contact hole connecting the pixel electrode and a TFT can hardly be formed. In addition, to cancel the effect of the capacitive coupling by increasing the thickness, the interlayer capacitor must generally have a very large thickness. This goes against the present general trend of miniaturizing and higher-density packaging of such electro-optic devices.

Such a problem can be found not only between the pixel electrode and the data line but also between various components formed on the substrate. For example, the aforementioned parasitic capacitance can be formed between a data line and a fixed-potential capacitive electrode constituting a storage capacitance or between the fixed-potential capacitive electrode and a scanning line. Such a parasitic capacitance once formed makes components facing each other to have a potential out of what it should be to thereby possibly inhibit normal operations of the electro-optic device.

Under these circumstances, the present invention has been accomplished, and an object of the present invention is to provide an electro-optic device that can display high-quality images which are free of, for example, irregular display along a data line induced by variations in the potential of a pixel electrode, which variations are induced by energization in the data line. Another object of the present invention is to provide an electro-optic device that can minimize a parasitic capacitance formed between components arranged on a substrate and can always ensure normal operation. A further object of the present invention is to provide electronic equipment having such an electro-optic device.

To solve the above problems, an electro-optic device of the present invention can include a substrate, and, on the substrate, data lines extending in a set direction, scanning lines extending in a direction perpendicular to the data lines, and pixel electrodes and thin film transistors each being arranged so as to correspond to the regions of intersection between the data lines and the scanning lines. The device can further include a storage capacitance having pixel-potential capacitive electrodes connected to the pixel electrodes and thin film transistors, fixed-potential capacitive electrodes facing the pixel-potential capacitive electrodes, and a dielectric film arranged between the pixel-potential capacitive electrodes and the fixed-potential capacitive electrodes, a first interlayer insulator arranged between the fixed-potential capacitive electrodes and the scanning lines, a second interlayer insulator arranged between the data lines and the fixed-potential capacitive electrodes, and a third interlayer insulator arranged between the pixel electrodes and the data lines, in which at least one of the first interlayer insulator, the second interlayer insulator, and the third interlayer insulator has a relative dielectric constant lower than that of the dielectric film constituting the storage capacitance.

According to the electro-optic device of the present invention, by controlling the switching operation of a thin film transistor as an example of pixel switching element through a scanning line and by supplying a picture signal through a data line, a voltage corresponding to the picture signal can be applied through the thin film transistor to the pixel electrode (active matrix driving).

In particular, the electro-optic device according to the present invention can include at least the storage capacitance having a multilayer assemblage of the pixel-potential capacitive electrode, the dielectric film and the fixed-potential capacitive electrode, and the first, second and third interlayer insulators arranged between the individual components, in which at least one of these interlayer insulator has a relative dielectric constant lower than that of the dielectric film. Specifically, these interlayer insulators have relatively low relative dielectric constants. Thus, the first interlayer insulator can serve to decrease the level of a parasitic capacitance formed between the fixed-potential capacitive electrode and the scanning line. The second interlayer insulator can serve to decrease the level of a parasitic capacitance formed between the data line and the fixed-potential capacitive electrode. The third interlayer insulator can serve to decrease the level of a parasitic capacitance formed between the pixel electrode and the data line.

Consequently, the electro-optic device can reduce the possibility of parasitic capacitance-induced variations in potential between components facing each other with the interposition of these interlayer insulators and thereby can operate more accurately. In particular, the third interlayer insulator can prevent variations in the potential of the pixel electrodes caused by energization of a data line to thereby decrease the possibility of, for example, irregular display along the data line.

In addition to the above operation and advantages, providing the storage capacitance itself enables the pixel electrodes to hold their potential more satisfactorily, and the electro-optic device of the present invention can thereby display high-quality images with good properties such as high contrast.

The dielectric film constituting the storage capacitance for use in the present invention preferably includes a material having a relatively high relative dielectric constant. Thus, the resulting storage capacitance can make the pixel electrodes to hold their potential further more satisfactorily. Such materials include, for example, silicon nitride and tantalum oxide. The dielectric film may not necessarily have a single layer structure but may have a multilayer structure comprising two or more layers. In this case, the phrase lower than that of the dielectric film as used herein can be read as lower than the relative dielectric constant of a layer having a material having the highest relative dielectric constant among the constitutional two or more layers.

According to an embodiment of the electro-optic device of the present invention, the third interlayer insulator has a relative dielectric constant lower than those of the first interlayer insulator and the second interlayer insulator. According to this embodiment, the third interlayer insulator arranged between the pixel electrodes and the data lines has the relatively lowest relative dielectric constant and can thereby extremely decrease the level of the parasitic capacitance formed between these components. Thus, the formation of irregular display along the data lines can be more effectively prevented, which is a main object of the present invention.

According to another embodiment of the electro-optic device of the present invention, at least one of the first interlayer insulator, the second interlayer insulator, and the third interlayer insulator has a relative dielectric constant less than 3.9. According to this embodiment, the relative dielectric constant of each interlayer insulator is set optimally, and the aforementioned operation and advantages can be obtained more reliably. The relative dielectric constant is more preferably about 2.0 or less. In this connection, silicon oxide which has been widely used as an insulator has a relative dielectric constant of 3.9.

According to yet another embodiment of the electro-optic device of the present invention, at least one of the first interlayer insulator, the second interlayer insulator, and the third interlayer insulator has a thickness of 800 nm or more. According to this embodiment, each interlayer insulator has a relatively large thickness and can thereby decrease the level of the parasitic capacitance. The thickness is more preferably about 1000 nm or more.

According to still another embodiment of the electro-optic device of the present invention, at least one of the first interlayer insulator, the second interlayer insulator, and the third interlayer insulator comprises an inorganic material. According to this embodiment, each interlayer insulator comprises an inorganic material, and the resulting electro-optic device can thereby have relatively high heat resistance. In consideration of semiconductor layers constituting thin film transistors undergo annealing and other treatments at relatively high temperatures, the structure according to this embodiment has outstanding advantages. The advantages of this embodiment are further outstanding when the electro-optic device is used as a light valve in a projection display device. This is because relatively high-power radiation is applied to the light valve, and thereby heat accumulates and temperature rises in the light valve.

According to another embodiment of the electro-optic device of the present invention, the inorganic material comprises at least one of SiOF and amorphous carbon. According to these configurations, each of the interlayer insulators has one of optimum embodiments from the viewpoint of dielectric constant or heat resistance. Accordingly, the aforementioned operation and advantages can be obtained more reliably.

The "SiOF" for use in the present embodiment can be prepared, for example, by plasma CVD or high density plasma (HDP) CVD using $SiH_4$, $DF_4$, $SiF_6$, and/or $S_2F_6$ as raw materials.

According to yet another embodiment of the electro-optic device of the present invention, a semiconductor layer constituting the thin film transistors comprises low temperature polycrystalline silicon, and at least one of the first interlayer insulator, the second interlayer insulator, and the third interlayer insulator comprises an organic material. According to this embodiment, the semiconductor layer constituting the thin film transistor comprises low temperature polycrystalline silicon. Specifically, the electro-optic device can be produced by a "low temperature process" and can thereby be surely easily produced. In particular, each interlayer insulator according to this embodiment includes an organic material that can be relatively easily prepared. Accordingly, the electro-optic device can be further surely easily produced. For example, some of the interlayer insulators having the organic material can be formed by spin coating, and the electro-optic device using this type of organic material can be further surely easily produced. Such organic materials generally have somewhat poor heat resistance. However, the electro-optic device according to this embodiment can be produced by the low temperature process as mentioned above, and the heat resistance of the organic materials presents no problem.

The organic material as used in the present embodiment can include, for example, hydrogen silsesquioxane (HSQ), methylsilsesquioxane, aerogel/xerogel, polyimides, fluorinated polyimides, poly(allylene ether)s, fluorinated poly(allylene ether)s, divinylsiloxane (DVS)-benzocyclobutene, perfluorocyclobutene, Parylene-N, Parylene-F, Polynaphthalene-N, Polynaphthalene-F, and Teflon (registered trademarks). Among these materials, methylsilsesquioxane, aerogel/xerogel, polyimides, fluorinated polyimides, poly(allylene ether)s, fluorinated poly(allylene ether)s, DVS-benzocyclobutene, and perfluorocyclobutene can be advantageously prepared by the spin coating.

In yet another embodiment of the electro-optic device of the present invention, the pixel electrodes are at least partially nonoverlapping with the data lines when viewed from above. According to this embodiment, the pixel electrodes are at least partially nonoverlapping with the data lines when viewed from above. Consequently, the parasitic capacitance does not fundamentally occur in the nonoverlapping portion. Thus, the aforementioned operation and advantages can be more reliably obtained.

According to another embodiment of the electro-optic device of the present invention, the electro-optic device further includes a shield layer having a fixed potential and being arranged between the pixel electrodes and the data lines, in which the third interlayer insulator can have a fourth interlayer insulator arranged between the pixel electrodes and the shield layer, and a fifth interlayer insulator arranged between the shield layer and the data lines, and at least one of the fourth interlayer insulator and the fifth interlayer insulator has a relative dielectric constant lower than that of the dielectric film. According to this embodiment, the electro-optic device further includes a shield layer having a fixed potential and being arranged between the pixel electrodes and the data lines, and the pixel electrodes and the data lines thereby do not directly face each other in the resulting structure. Consequently, the influence of a direct parasitic capacitance between the two components is eliminated to a considerable extent, and similar operation and advantages to those mentioned above can be obtained.

In addition, such a shield layer is further added in the present embodiment, and the third interlayer insulator is thereby divided into the fourth and fifth interlayer insulators, and these fourth and fifth interlayer insulators each have a relative dielectric constant lower than that of the dielectric film constituting the storage capacitance. Thus, a parasitic capacitance that can be formed between the pixel electrode and the shield layer or between the shield layer and the data line can hardly be formed. The aforementioned operation and advantages can be very effectively obtained.

According to still another embodiment of the electro-optic device of the present invention, the fifth interlayer insulator has a relative dielectric constant lower than that of the fourth interlayer insulator. According to this configuration, the variations in the potential of the shield layer can be reduced and the variations in the potential of the pixel electrodes can be significantly minimized. According to this embodiment, therefore, the operation and advantages of preventing irregular display along the data lines can be obtained further effectively, which is a main object of the present invention.

In another embodiment of the electro-optic device of the present invention, the electro-optic device includes the substrate, and a semiconductor layer constituting the thin film transistors, the scanning lines arranged on the semiconductor layer and comprising gate electrodes of the thin film transistors, the pixel-potential capacitive electrodes; the dielectric film, the fixed-potential capacitive electrodes, the data lines, and the pixel electrodes, each of which is arranged on the substrate in this order. This embodiment can provide an optimum arrangement or layout.

In yet another embodiment of the electro-optic device of the present invention, the fixed-potential capacitive electrodes constitute a part of capacitive lines arranged along the scanning lines. According to this embodiment, the fixed-potential capacitive electrodes constitute a part of capacitive lines arranged along the scanning lines, and thereby the electro-optic device can have a simplified multilayer structure. In addition, by allowing the fixed-potential capacitive electrodes to constitute a part of such a linear member, the linear member has only to be connected at one end thereof to a predetermined electric source to make the fixed-potential capacitive electrodes have fixed potential. Thus, a storage capacitance with higher reliability can be constituted, and individual pixels can have a storage capacitance having the same properties.

To solve the above problems, the electronic equipment of the present invention can include the electro-optic device of the present invention (including individual embodiments).

The electronic equipment of the present invention can display high-quality images without variations in the potential of pixel electrodes arising from energization of data lines and can thereby avoid irregular display on images along the data lines. Such electronic equipment includes, for example, projection display devices (liquid crystal projectors), liquid crystal televisions, mobile phones, electronic personal organizers, word processors, viewfinder or monitor-direct-view videotape recorders, workstations, picture telephones, POS terminals, touch panels, and other electronic equipment.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

The operation and other advantages of the present invention will be described in detail with reference to several embodiments below. Several embodiments of the present invention will be illustrated in detail with reference to the attached drawings. In the following embodiments, the electro-optic device of the present invention is applied to a liquid crystal device.

Figure 1:
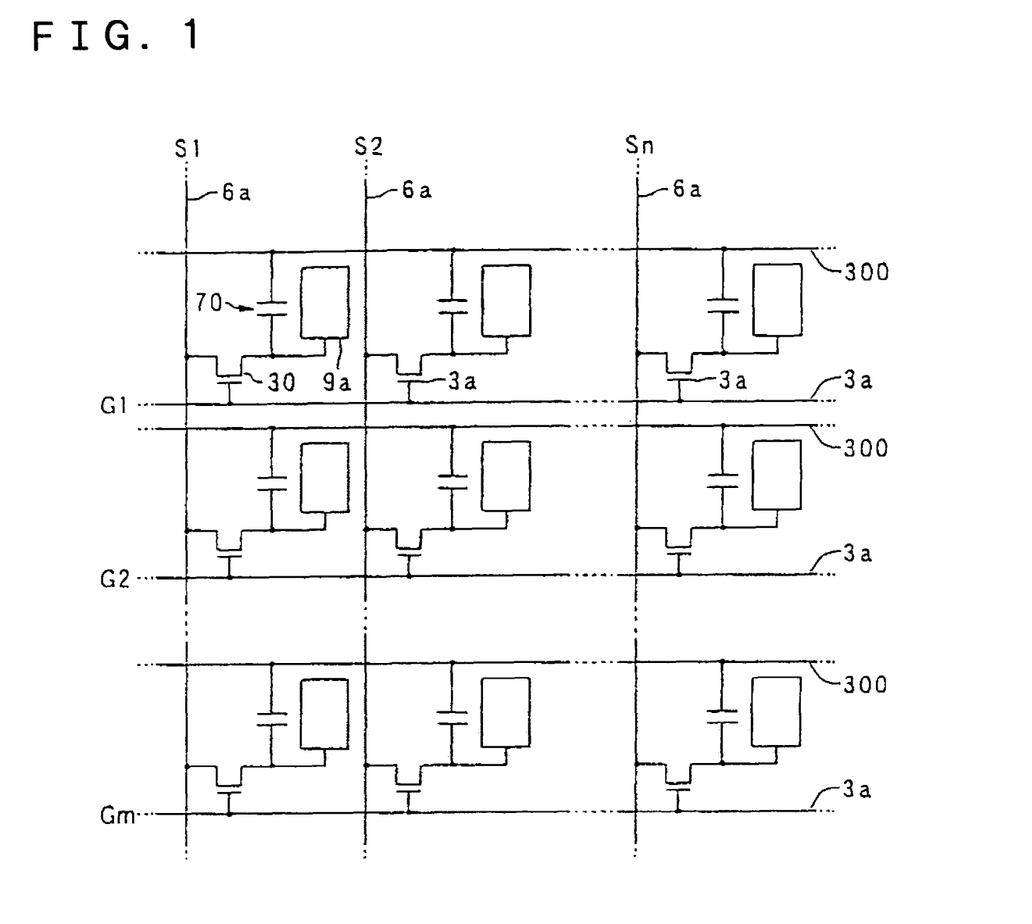
FIG. 1 is a circuit diagram showing an equivalent circuit of elements, wirings, and other components in plural pixels being arranged in a matrix and constituting an image display area in an electro-optic device according to an embodiment of the present invention.
Figure 2:
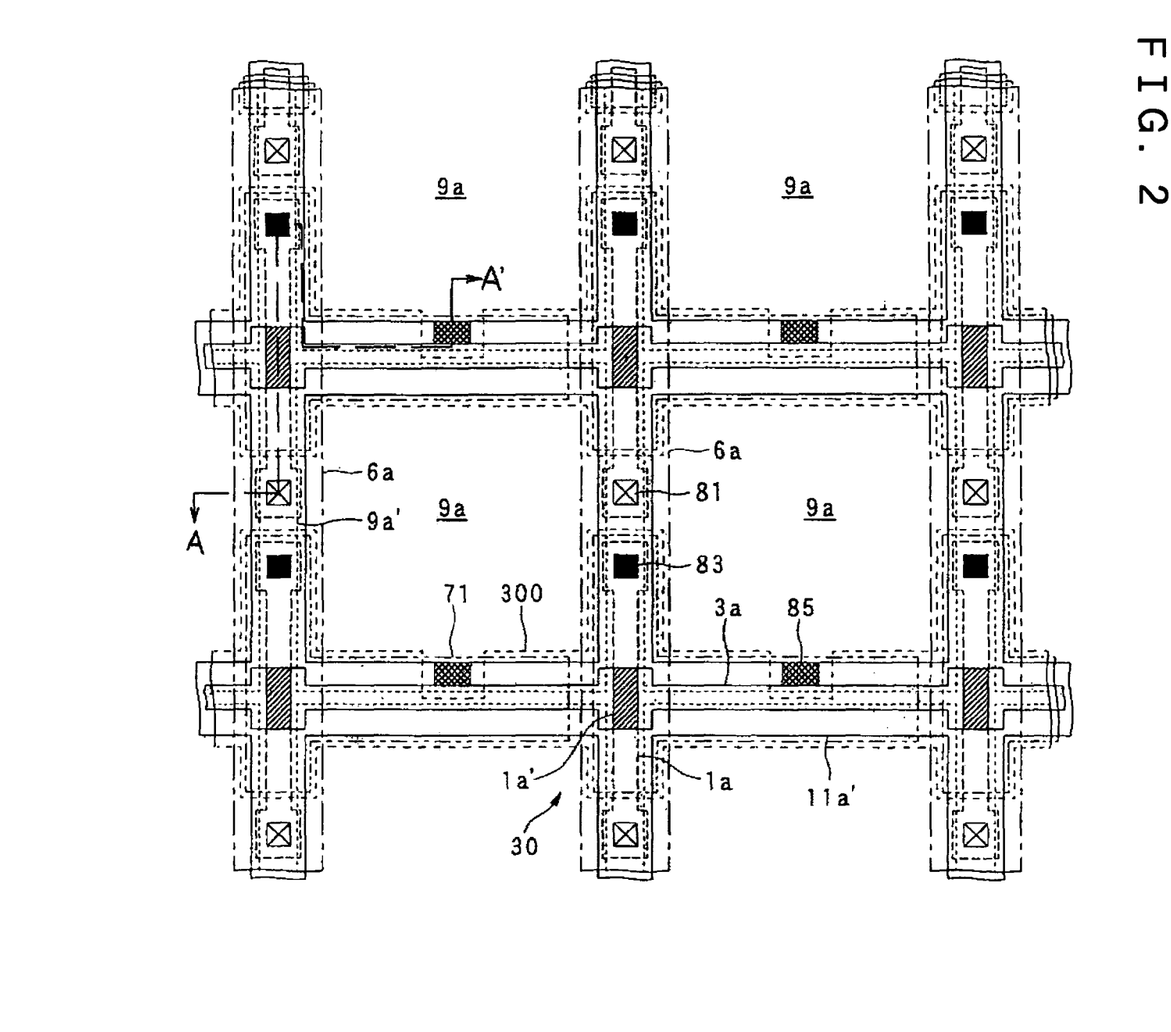
FIG. 2 is a plan view of plural pixel groups adjacent to each other in a TFT array substrate having, for example, data lines, scanning lines, and pixel electrodes in the electro-optic device according to the embodiment of the present invention.
Figure 3:
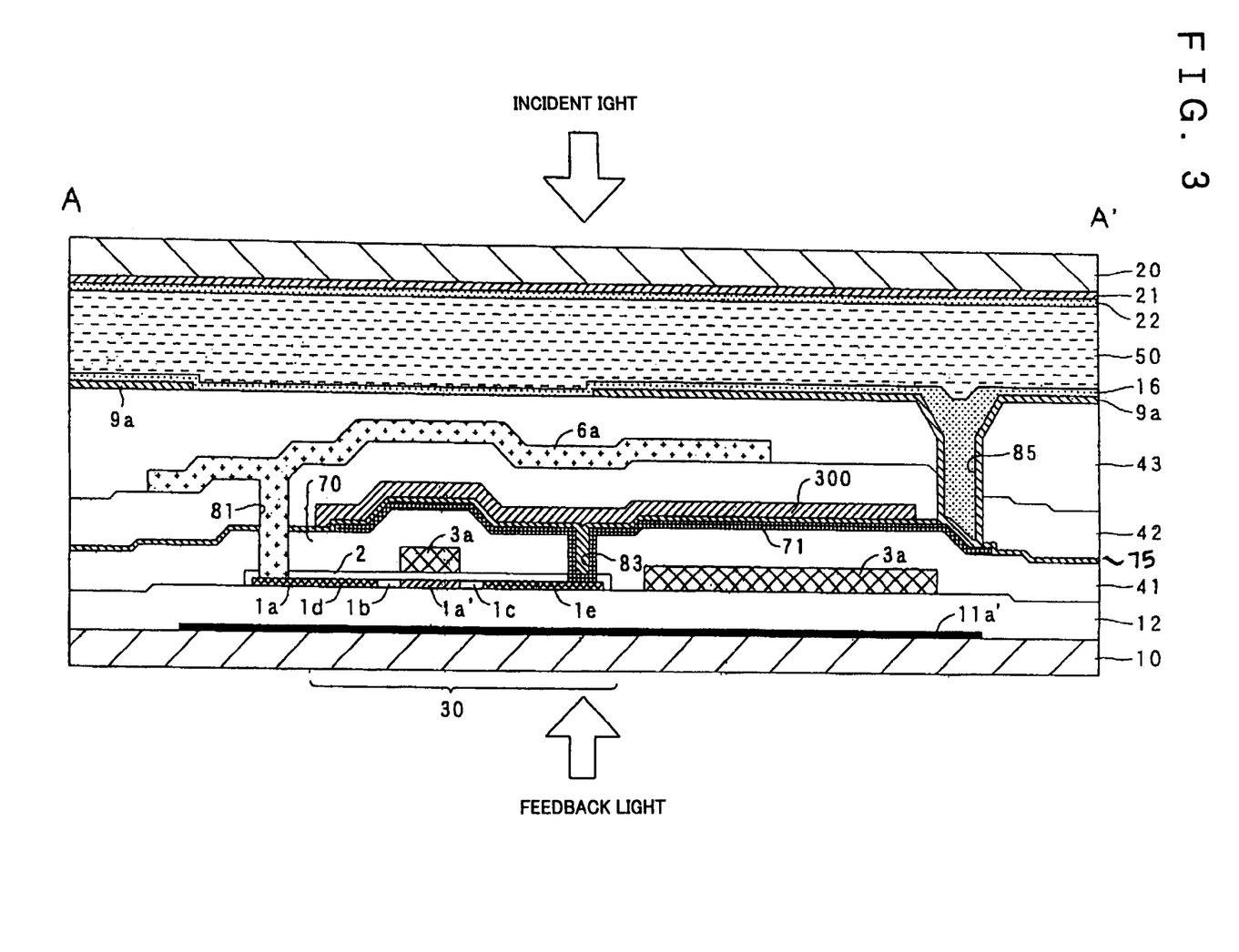
FIG. 3 is a cross sectional view taken along line A–A' in FIG. 2.

Initially, the configuration in a pixel area in an electro-optic device according to a first embodiment of the present invention will be illustrated with reference to FIGS. 1 to 3. FIG. 1 shows an equivalent circuit of elements, wiring and other components in plural pixels arranged in a matrix and constituting an image display area of the electro-optic device. FIG. 2 is a plan view of plural pixel groups adjacent to each other in a TFT array substrate having, for example, data lines, scanning lines, and pixel electrodes. FIG. 3 is a cross sectional view taken along line A–A' in FIG. 2. In FIG. 3, individual layers and individual members are drawn to different scales so as to allow the individual layers and members to have sizes recognizable in the figure.

With reference to FIG. 1, the matrix plural pixels constituting the image display area of the electro-optic device in the present embodiment each include a pixel electrode 9a and a TFT 30 for switching and controlling the pixel electrode 9a. A data line 6a is electrically connected to the source of the TFT 30, and picture signals are supplied to the data line 6a. Picture signals S1, S2, . . . , Sn to be written in the data line 6a can be supplied line-sequentially in this order to each line or can be supplied to each group of adjacent plural data lines 6a.

A scanning line 3a is electrically connected to the gate of the TFT 30 to thereby apply pulsewise scanning signals G1, G2, . . . , Gm to the scanning line 3a in this order line-sequentially in predetermined timing. The pixel electrode 9a is electrically connected to the drain of the TFT 30. By closing the switch of the TFT 30 as a switching device for a predetermined time period, the picture signals S1, S2, . . . , and Sn supplied from the data lines 6a are written in predetermined timing.

The picture signals S1, S2, . . . , and Sn at a predetermined level written through the pixel electrode 9a on a liquid crystal are held for a predetermined time between the pixel electrode 9a and a counter electrode arranged on a counter substrate. The liquid crystal just mentioned above is taken as an example of electrooptic substances. The liquid crystal changes the orientation and order of its molecular association depending on the level of the applied voltage to modulate light to thereby provide gradational display. The liquid crystal has decreased transmittance to incident light depending on the applied voltage in each pixel unit in a normally white mode and has increased transmittance depending on the applied voltage in each pixel unit in a normally black mode. As a whole, the electro-optic device emits light with contrast corresponding to picture signals.

To avoid leakage of the held picture signals, a storage capacitance 70 is applied in shunt with a liquid crystal capacitance formed between the pixel electrode 9a and its counter electrode. A series of the storage capacitance 70 is arranged in parallel with the scanning line 3a and includes the fixed-potential capacitive electrode and a capacitive line 300 fixed at a constant potential.

The actual configuration of the electro-optic device exhibiting the aforementioned circuitry operation by action of the data lines 6a, scanning lines 3a, TFTs 30 and other components will be illustrated below with reference to FIGS. 2 and 3.

With reference to FIG. 3, i.e., a cross sectional view taken along line A–A' in FIG. 2, the electro-optic device according to the present embodiment can include a transparent TFT array substrate 10 and a transparent counter substrate 20 arranged so as to face the TFT array substrate 10. The TFT array substrate 10 is, for example, a quartz substrate, a glass substrate, or a silicon substrate, and the counter substrate 20 is, for example, a glass substrate or a quartz substrate.

With reference to FIG. 3, the TFT array substrate 10 has a pixel electrode 9a and an alignment layer 16 on the pixel electrode 9a. The alignment layer 16 has been subjected to a predetermined orientation treatment, such as rubbing. The pixel electrode 9a can include a transparent conductive film such as an indium tin oxide (ITO) film. The counter substrate 20 has a counter electrode 21 arranged on its entire surface and an alignment layer 22 below the counter electrode 21. The alignment layer 22 has been subjected to a predetermined orientation treatment such as rubbing. The counter electrode 21 can include a transparent conductive film such as an ITO film as in the pixel electrode 9a. The alignment layers 16 and 22 comprise a transparent organic film, such as a polyimide film. An electrooptic substance such as liquid crystal is encapsulated into a space between the TFT array substrate 10 and the counter substrate 20 facing each other and surrounded by a sealant mentioned below (see FIGS. 8 and 9) to thereby form a liquid crystal layer 50. The liquid crystal layer 50 exhibits a set orientation by action of the alignment layers 16 and 22 when no electric filed is applied from the pixel electrode 9a. The liquid crystal layer 50 comprises an electrooptic substance including one or more types of nematic liquid crystals. The sealant is an adhesive comprising, for example, a light-curable resin or a thermo-setting resin so as to bond the TFT substrate 10 and the counter substrate 20 on their peripheries. It also includes a spacer, such as glass fibers or glass beads, so as to set the distance between the two substrates at a predetermined level.

With reference to FIG. 2, a plurality of the pixel electrodes 9a is arranged in a matrix on the TFT array substrate 10, each of which outline is indicated by dotted lines 9a'. Data lines 6a and scanning lines 3a are arranged along the vertical and horizontal boundaries of the pixel electrodes 9a, respectively. The data lines 6a each include, for example, a metal film such as an aluminium film or an alloy film, and the scanning lines 3a each include, for example, a conductive polycrystalline silicon film. The scanning lines 3a are arranged so as to face a channel region 1a' indicated by the positive slope area in FIG. 2 in the semiconductor layer 1a and serve as a gate electrode.

Specifically, TFTs 30 for pixel switching are arranged at each point of intersection of the scanning lines 3a and the data lines 6a. In the TFTs 30, the main lines of the scanning lines 3a are arranged as gate electrodes in the channel region 1a' so as to face each other.

The TFTs 30 have a lightly doped drain (LDD) structure and each can include, as constitutional elements, the scanning line 3a serving as a gate electrode as mentioned above, the channel region 1a' of the semiconductor layer 1a which includes, for example, a polycrystalline silicon film and forms a channel by action of an electric field from the scanning line 3a, an insulating film 2 including a gate insulating film for insulating the scanning line 3a from the semiconductor layer 1a. The semiconductor layer 1a herein further includes a lightly doped source region 1b, a lightly doped drain region 1c, a heavily doped source region 1d, and a heavily doped drain region 1e.

The TFTs 30 preferably have a LDD structure, as shown in FIG. 3, but may have an offset structure in which dopants are not injected into the lightly doped source region 1b and the lightly doped drain region 1c or may have a self-alignment structure in which dopants are injected at a high concentration using the gate electrode including a part of the scanning line 3a as a mask to thereby form a heavily doped source region and a heavily doped drain region in a self-alignment manner. The electro-optic device according to this embodiment has a single gate structure in which only one gate electrode of each TFT 30 for pixel switching is arranged between the heavily doped source region 1*d* and the heavily doped drain region 1*e*, but two or more gate electrodes can be arranged between the two components. By allowing the TFT to have dual gates or triple or more gates in this manner, a leak current at the junction between the channel and the source and drain regions can be prevented to thereby reduce a current flowing when the switch is Off. The semiconductor layer 1*a* constituting the TFTs 30 can be either a non-single-crystal layer or a single-crystal layer. Such a single-crystal layer can be formed according to a conventional procedure such as bonding. By forming the semiconductor layer 1*a* from a single-crystal layer, a peripheral circuitry can have further higher performance.

With reference to FIG. 3, an intermediary layer 71 is arranged so as to face a part of the capacitive line 300 with the interposition of a dielectric film 75 to thereby form the storage capacitance 70. The intermediary layer 71 is connected to the heavily doped drain region 1*e* of the TFT 30 and the pixel electrode 9*a* and serves as a pixel-potential capacitive electrode. The capacitive line 300 serves as a fixed-potential capacitive electrode. By action of the storage capacitance 70, the pixel electrode 9*a* can hold its potential further more satisfactorily.

The intermediary layer 71 includes, for example, a conductive polycrystalline silicone film and serves as the pixel-potential capacitive electrode. The intermediary layer 71 can be a single-layer film or a multilayer film including a metal or alloy as in the capacitive line 300 mentioned below. The intermediary layer 71 serves as the pixel-potential capacitive electrode and serves to relay and connect between the pixel electrode 9*a* and the heavily doped drain region 1*e* of the TFT 30 via the contact holes 83 and 85.

The capacitive line 300 includes, for example, a conductive film including a metal or alloy and serves as the fixed-potential capacitive electrode. With reference to FIG. 2, the capacitive line 300 is formed so as to overlap, when viewed from above, a region on which the scanning line 3*a* is formed. More specifically, the capacitive line 300 has a main line area extending along the scanning line 3*a*, protrusion areas protruding upward along the data lines 6*a* from points of intersection with the data lines 6*a* in the figure, respectively, and constriction areas which correspond to contact holes 85 and are slightly constricted. Among them, the protrusion areas contribute to increase the area of the storage capacitance 70 by using regions above the scanning lines 3*a* and regions below the data lines 6*a*. The capacitive line 300 is preferably arranged so as to extend from an image display area 10*a* having the pixel electrode 9*a* toward its surroundings and is electrically connected to a constant-potential source to thereby have a fixed potential. Such a constant-potential source can be a constant-potential source such as positive power source or negative power source supplied to a data line driving circuit 101 or can be a constant potential supplied to the counter electrode 21 of the counter substrate 20.

With reference to FIG. 3, the dielectric film 75 can include, for example, a relatively thin silicon oxide film (relative dielectric constant: 3.9), such as high temperature oxide (HTO) film or low temperature oxide (LTO) film having a thickness of, for example, about 5 to about 200 nm. From the viewpoint of increasing the storage capacitance 70, the dielectric film 75 is preferably as thin as possible, as long as the film exhibits sufficient reliability. Materials for the dielectric film 75 include, for example, insulating materials comprising at least one of TaOx (tantalum oxides), BST (barium strontium titanate), PZT (lead zirconate titanate), $TiO_2$ (titanium dioxide), $ZiO_2$ (zirconium dioxide), $HfO_2$ (hafnium dioxide), SiON (silicon oxynitride), and SiN (silicon nitride). In particular, by using a material having a high dielectric constant, such as TaOx, BST, PZT, $TiO_2$, $ZiO_2$, or $HfO_2$, the capacitance in a limited area on the substrate can be increased. By using a silicon-containing material, such as $SiO_2$ (silicon dioxide), SiON (silicon oxynitride), or SiN, the formation of stress, for example, in interlayer insulators can be reduced.

Specifically according to the present embodiment, a third interlayer insulator 43 arranged above the data line 6*a* and below the pixel electrode 9*a* can include an inorganic material, such as at least one of SiOF and amorphous carbon. The third interlayer insulator 43 thereby has a relative dielectric constant of 3.5 or 2.1 to 2.3, lower than that of the silicon oxide film constituting the dielectric film 75. Thus, a parasite capacitance formed between the pixel electrode 9*a* and the data line 6*a* can be minimized. The operation and advantages on this point will be described again later.

The third interlayer insulator 43 has a contact hole 85 leading to the intermediary layer 71. The third interlayer insulator 43 has a surface smoothed by, for example, chemical mechanical polishing to thereby reduce irregular orientation of the liquid crystal layer 50 due to steps formed by wiring and elements below the third interlayer insulator 43. In stead of, or in addition to subjecting the third interlayer insulator 43 to a smoothing treatment, the surface may be smoothened by forming a groove in at least one of the TFT array substrate 10, an underlayer insulating film 12, the first interlayer insulator 41, and the second interlayer insulator 42 and embedding, for example, wiring of the data line 6*a* and TFT 30 in the groove.

The electro-optic device shown in FIGS. 2 and 3 can further include a lower shielding film 11*a* below the TFT 30. The lower shielding film 11*a* is patterned in a grid to thereby define the opening area of each pixel. With reference to FIG. 2, the data lines 6*a* and the capacitive line 300 arranged so as to cross the data lines 6*a* also define the opening area. To avoid adverse effects of its variations on the TFT 30, the lower shielding film 11*a* should be preferably arranged so as to extend from the image display area to its surroundings, as in the capacitive line 300.

The underlayer insulating film 12 is arranged below the TFT 30. The underlayer insulating film 12 serves to insulate the TFT 30 from the lower shielding film 11*a*. In addition, formed on the entire surface of the TFT array substrate 10, the underlayer insulating film 12 serves to prevent changes in properties of the TFT 30 for pixel switching due to roughness formed during surface polishing of the TFT array substrate 10 or dust remaining after cleaning.

The first interlayer insulator 41 is arranged above the scanning line 3*a*. The first interlayer insulator 41 has openings of a contact hole 81 leading to the heavily doped source region 1*d*, and a contact hole 83 leading to the heavily doped drain region 1*e*.

The intermediary layer 71 and the capacitive line 300 are arranged on the first interlayer insulator 41, and the second interlayer insulator 42 is arranged on these components. The second interlayer insulator 42 has openings of the contact hole 81 leading to the heavily doped source region 1*d*, and the contact hole 85 leading to the intermediary layer 71.

In the present embodiment, the first interlayer insulator 41 can be fired at about 1000° C. to thereby activate ions injected into the polysilicon films constituting the semiconductor layer 1*a* and the scanning line 3*a*. In contrast, the second interlayer insulator 42 is preferably not subjected to such firing. Thus, stress formed in the vicinity of the interface of the capacitive line 300 can be mitigated.

The electro-optic device having the aforementioned configuration according to the present embodiment includes the third interlayer insulator 43 having a relatively low relative dielectric constant and thereby exhibits the following operation and advantages.

Specifically, the third interlayer insulator 43 can include, for example, SiOF and thereby has a relatively low relative dielectric constant. Thus, the level of a parasitic capacitance formed between the pixel electrode 9a and the data line 6a can be minimized, and thereby variations in the potential of the pixel electrode 9a due to the parasitic capacitance and the energization of the data line 6a can be suppressed. Consequently, the electro-optic device according to the present embodiment can display high-quality images substantially free of irregular display along the data line 6a, in contrast to conventional equivalents.

Figure 4:
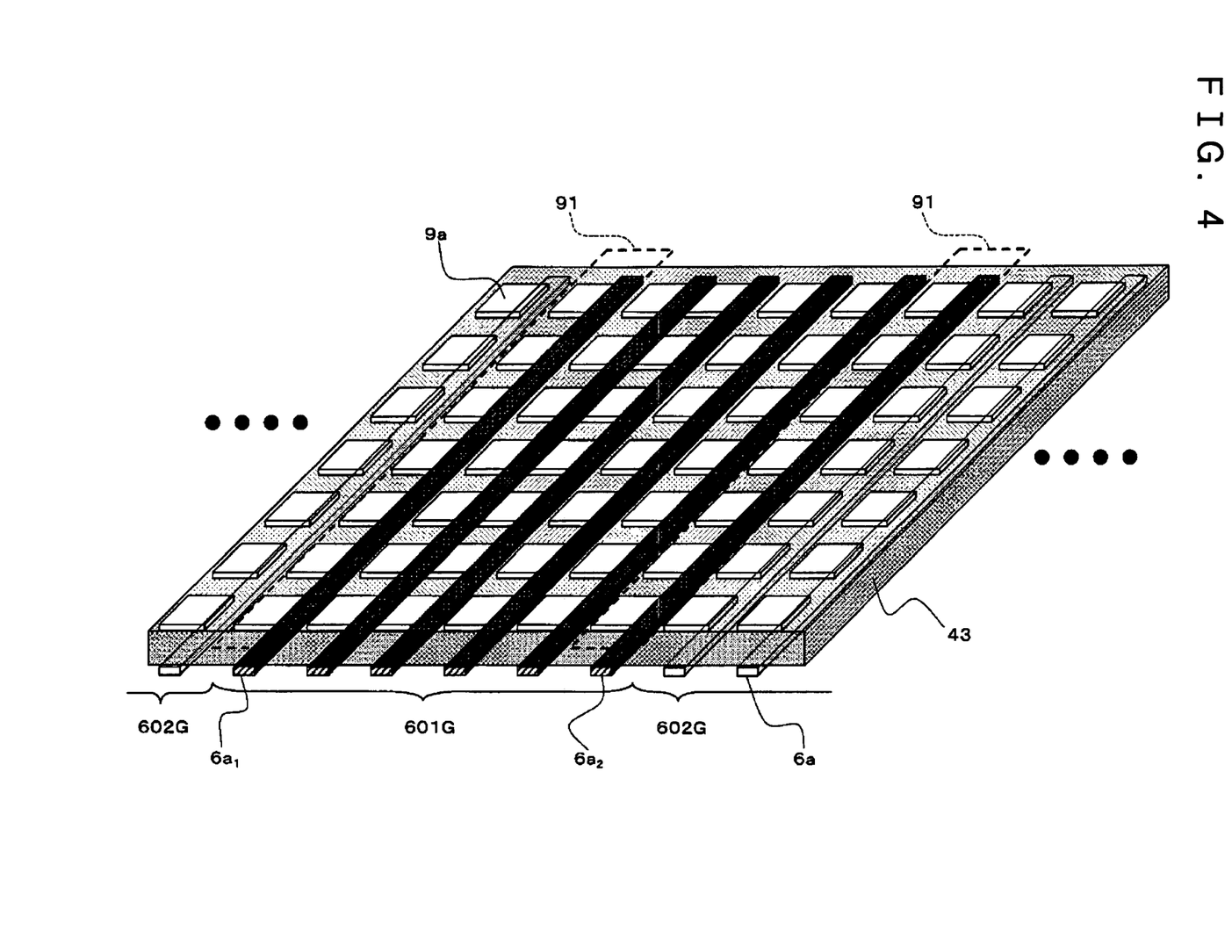
FIG. 4 is a schematic perspective view of supplying picture signals to the data lines.
Figure 5:
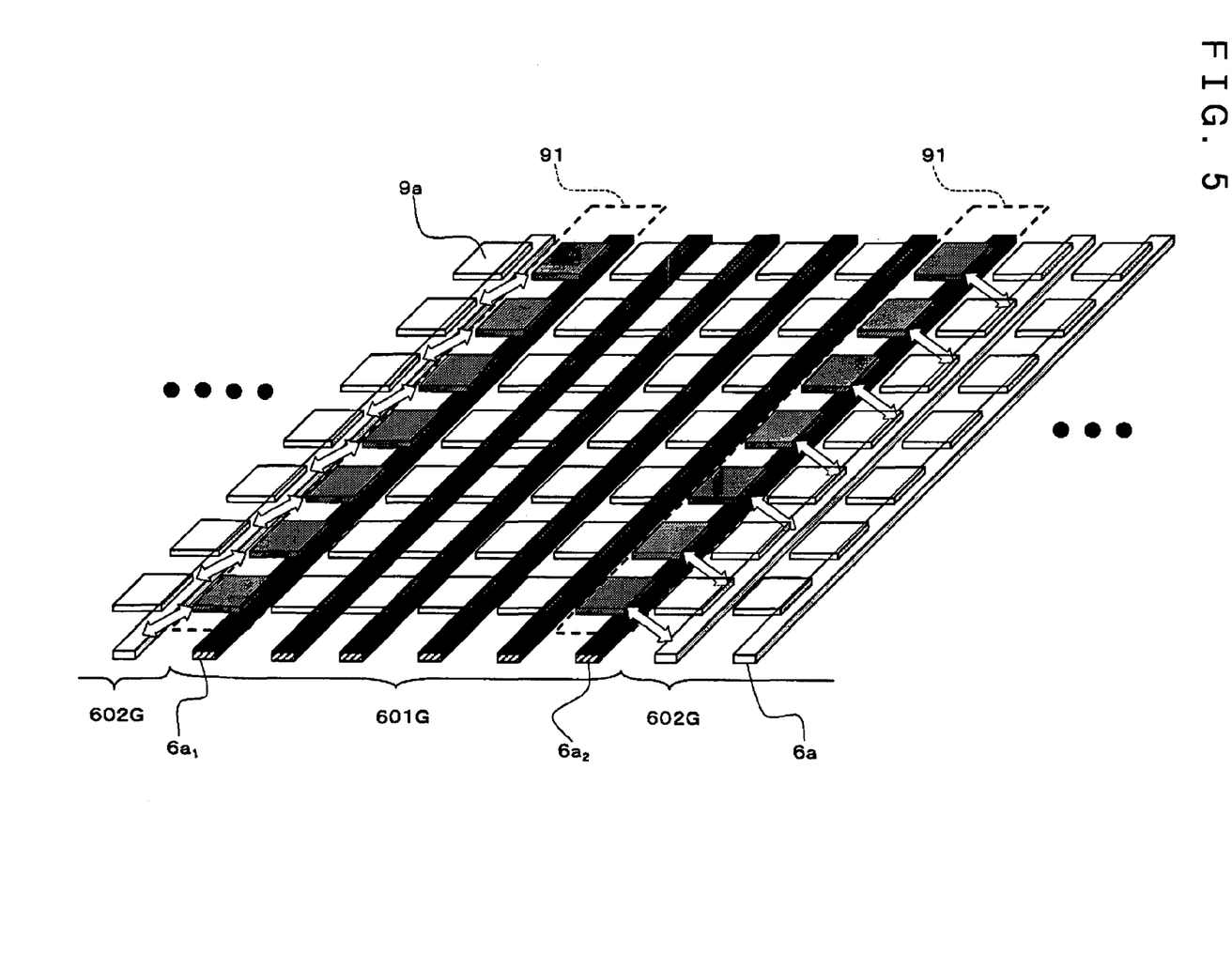
FIG. 5 is a schematic perspective view similar to FIG. 4, except for illustrating a parasitic capacitance formed between a pixel electrode and a data line.

These operation and advantages can be more effectively obtained when picture signals are concurrently supplied to plural adjacent data lines 6a. This is because such irregular display may occur or can be visually observed more significantly in this case. These circumstances will be illustrated below with reference to FIGS. 4 and 5. FIG. 4 is a schematic perspective view of supplying picture signals to the data lines, and FIG. 5 is a similar schematic perspective view except that a parasitic capacitance formed between a pixel electrode and a data line is schematically illustrated. In this connection, FIG. 4 does not show contact holes and other components to be illustrated and shows only the minimal configuration to describe principal operation and advantages according to the present embodiment, i.e., the data lines 6a, the pixel electrodes 9a and the third interlayer insulator 43. This is also true in FIG. 5. However, the third interlayer insulator is not shown in FIG. 5.

In the electro-optic device according to the present embodiment shown in FIG. 4, a picture signal to be supplied to the data lines 6a can include six parallel signals obtained by converting one serial signal into six parallel signals. Specifically, the picture signal is concurrently supplied to six data lines 6a as a group. In this procedure of supplying picture signals, the picture signal is not supplied to data lines 6a belonging to a non-supplied group 602G adjacent to a supplied group 601G to which the picture signal is actually supplied. In FIG. 4, black solid data lines 6a are data lines to which the picture signal is actually supplied, and the other data lines 6a are data lines to which the picture signal is not supplied.

Focusing attention on the supplied group 601G, capacitive coupling occurs between pixel electrodes 9a (reference numeral 91 in the figure) and data lines positioned outward thereof. The pixel electrodes 91 correspond to the leftmost data line $6a_1$ and the rightmost data line $6a_2$ in the figure. The resulting capacitive coupling is indicated by double pointed arrows in FIG. 5. With reference to FIG. 5, the potentials of the pixel electrodes 9a corresponding to the data line $6a_1$ and the data line $6a_2$ vary by action of the capacitive coupling. Figuratively speaking, the potentials are withdrawn by the capacitive coupling. Specifically, an electric field exactly corresponding to the picture signal is not applied to the pixel electrodes 9a. In this case shown in FIG. 5, images substantially along the data lines $6a_1$ and $6a_2$ are displayed irregularly. In addition, when irregular display occurs in each group comprising six data lines 6a as in this case, such a defect is more serious as it can be easily visually observed on images.

However, the electro-optic device according to the present embodiment includes the third interlayer insulator 43 having a relatively low relative dielectric constant and being arranged between the pixel electrodes 9a and the data lines 6a as shown in FIG. 4. In contrast to the electro-optic device shown in FIG. 5, the electro-optic device of FIG. 4 exhibits significantly minimized level of the parasitic capacitance. Thus, the pixel electrodes 9a corresponding to the data lines 6a do not vary in their potential.

As is described above, the electro-optic device of the present embodiment can minimize irregular display along the data lines 6a, in contrast to conventional equivalents.

In the above-exemplified electro-optic device according to the present embodiment, the third interlayer insulator 43 includes an inorganic material, and thereby has a relative dielectric constant lower than that of the dielectric film 75 constituting the storage capacitance 70. However, it should be understood that the present invention is not limited to such a configuration.

Not only the third interlayer insulator 43, but also the first interlayer insulator 41 and the second interlayer insulator 42 can include an inorganic material and thereby have a relative dielectric constant lower than that of the dielectric film 75. With reference to FIG. 3, the first interlayer insulator 41 is arranged between the scanning line 3a and the intermediary layer 71, and the second interlayer insulator 42 is arranged between the capacitive line 300 and the data line 6a. By allowing the first and second interlayer insulators 41 and 42 to have a relatively low relative dielectric constant as in this case, the level of a parasitic capacitance formed between the scanning line 3a and the intermediary layer 71 or one formed between the capacitive line 300 and the data line 6a can be minimized. Thus, variations in the potential of the intermediary layer 71 arising from energization of the scanning line 3a or those in the capacitive line 300 arising from energization of the data line 6a can be reduced.

As is described above, the electro-optic device according to the present embodiment includes each element free of unnecessary variations in potential due to the capacitive coupling and can thereby more accurately operate.

In the configuration described above, all the first, second, and third interlayer insulators 41, 42, and 43 have a low dielectric constant. However, various combinations of interlayer insulator(s) having a low relative dielectric constant can be employed. For example, the interlayer insulator(s) having a low relative dielectric constant can be the first interlayer insulator 41 alone, the second interlayer insulator 42 alone, the first and second interlayer insulators 41 and 42 alone, or the first and third interlayer insulators 41 and 43 alone. In any case, the operation and advantages of reducing the level of the parasitic capacitance between components positioned above and below the interlayer insulator(s) can be obtained, and the resulting electro-optic device can operate more accurately.

In the above embodiment, the third interlayer insulator 43 is specified to have a relative dielectric constant lower than that of the dielectric film 75. In addition, the third interlayer insulator 43 can have a relative dielectric constant lower than those of the first and second interlayer insulators 41 and 42. In this case, the third interlayer insulator 43 has the relatively lowest relative dielectric constant and can thereby serve to markedly reduce the level of the parasitic capacitance formed between the pixel electrodes 9a and the data lines 6a. Thus, irregular display along the data lines 6a can be more effectively prevented, which is a main object of the present invention.

The interlayer insulators 41, 42, and 43 in the above embodiments preferably have a thickness of 800 nm or more, and more preferably 1000 nm or more. Thus, the level of the parasitic capacitance can further be decreased, and the aforementioned operation and advantages can be more effectively obtained.

In the above embodiment, the pixel electrodes 9a and the data lines 6a are arranged so as to overlap with each other when viewed from above, as shown in FIG. 2. More preferably, the pixel electrodes 9a and the data lines 6a are arranged so as to overlap with each other as less as possible or not to overlap at all with each other. In this case, the parasitic capacitance is not formed, and the aforementioned operation and advantages can be performed more reliably.

A general summary of the aforementioned description is as follows. Specifically, the level Cs of a parasitic capacitance formed between two components positioned above and below an interlayer insulator can be expressed by the following equation:

$$Cs = \in \times (S/d)$$

wherein $\in$ is the relative dielectric constant of the interlayer insulator; d is the thickness of the interlayer insulator; and S is the area of overlapping portion of the two components when viewed from above. To minimize the capacitance level Cs, the relative dielectric constant $\in$ may be decreased, the overlapping area S may be increased, and/or the thickness d of the interlayer insulator may be increased according to the equation. The aforementioned means are based on this concept.

The above-exemplified third interlayer insulator 43 in the embodiment can include an inorganic material such as SiOF or amorphous carbon. However, it should be understood that the present invention is not specifically limited to this configuration. For example, the third interlayer insulator 43 can include an organic material instead thereof. Such organic materials for use herein include, for example, hydrogen silsesquioxane (HSQ), methylsilsesquioxane, aerogel/xerogel, polyimides, fluorinated polyimides, poly(arylene ether)s, fluorinated poly(arylene ether)s, DVS-benzocyclobutene, perfluorocyclobutene, Parylene-N, Parylene-F, Polynaphthalene-N, Polynaphthalene-F, and Teflon.

Some of such organic materials can be formed into interlayer insulators, for example, by spin coating. In this case, the electro-optic device according to the present embodiment can be more easily produced. The relative dielectric constants of these materials are shown in Table 1 below.

TABLE 1

| Material Name | Relative Dielectric Constant |
| --- | --- |
| SiOF | 3.5–3.8 |
| HSQ | 2.7–3.0 |
| Methylsilsesquioxane | 2.9 |
| Aerogel/xerogel | 1.1–3.0 |
| Polyimides | 2.6–3.4 |
| Fluorinated polyimides | 2.3–2.8 |
| Poly(arylene ether)s | 2.7–2.9 |
| Fluorinated poly(arylene ether)s | 2.7 |
| DVS-benzocyclobutene | 2.7 |
| Perfluorocyclobutene | 2.2 |
| Parylene-N | 2.6 |
| Parylene-F | 2.3 |
| Polynaphthalene-N | 2.3 |
| Polynaphthalene-F | 2.3 |
| Teflon | 1.9 |
| Amorphous carbon | 2.1–2.3 |

Table 1 shows that the relative dielectric constant in any case is lower than the relative dielectric constant 3.9 of a silicon oxide film, and the operation and advantages of avoiding the influence of the capacitive coupling can be obtained to certain extent.

When the interlayer insulator is formed from an organic material as mentioned above, the semiconductor layer 1a of the TFT 30 is preferably formed from a low temperature polycrystalline silicon film. Such organic materials are generally insufficient in heat resistance, and the interlayer insulator formed from an organic material may be adversely affected when the electro-optic device is produced at a high temperature. However, when the electro-optic device is produced by a low temperature process, such adverse effects are trivial.

Figure 6:
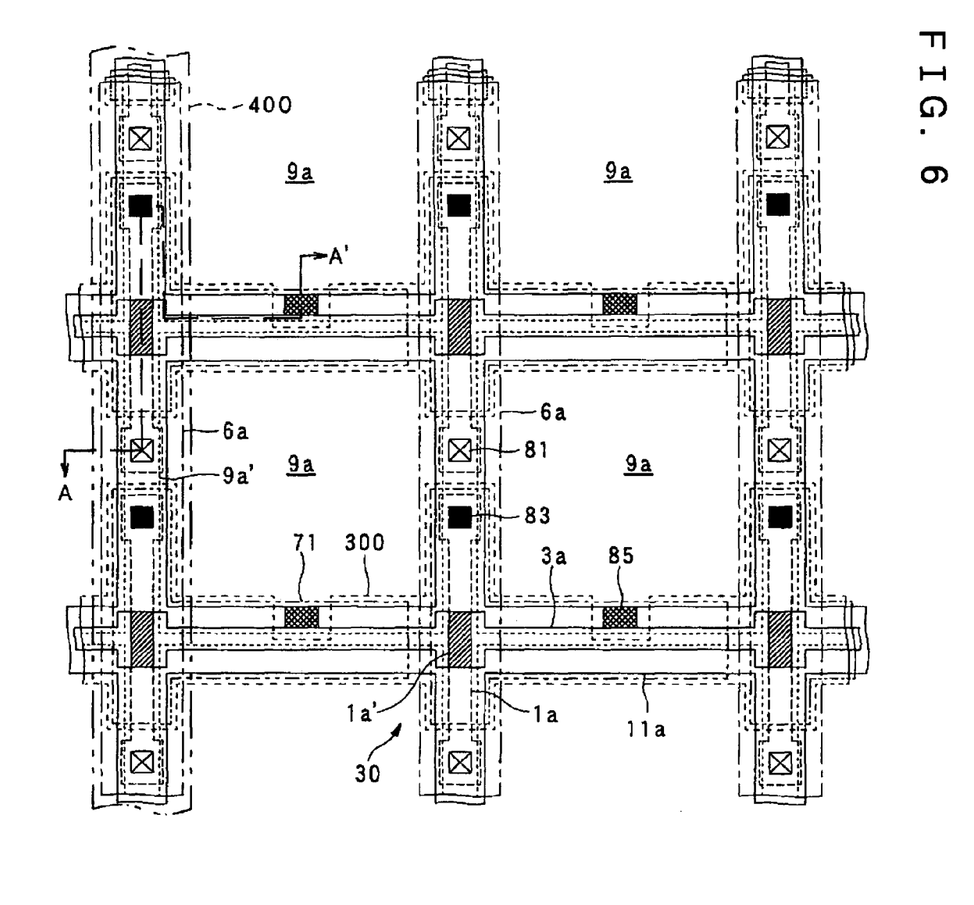
FIG. 6 is a cross sectional view similar to FIG. 2, except for illustrating an embodiment in which a shield layer is further arranged between a data line and a pixel electrode.
Figure 7:
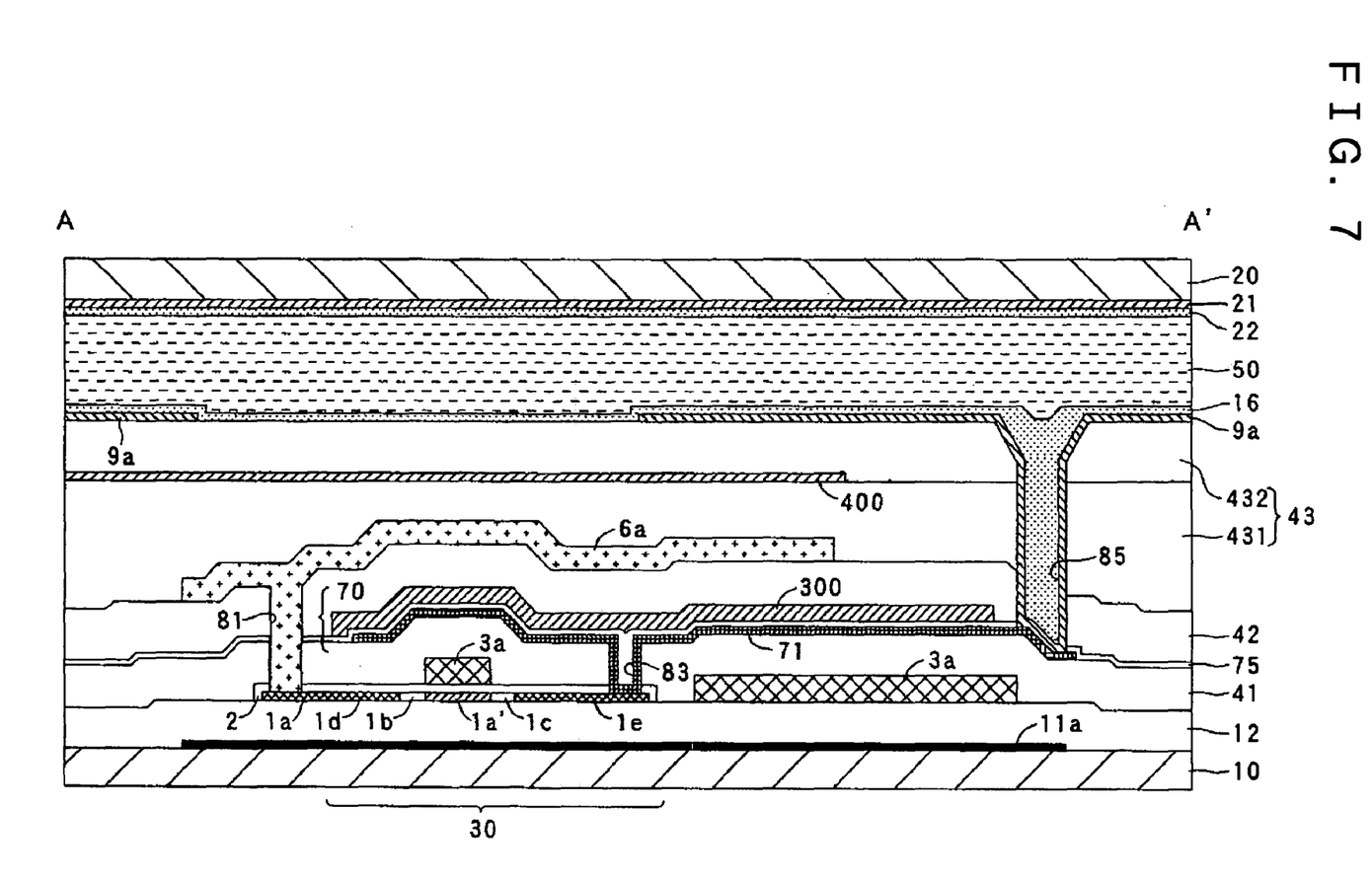
FIG. 7 is a cross sectional view similar to FIG. 3, except for illustrating the embodiment in which a shield layer is further arranged between a data line and a pixel electrode.

A second embodiment of the present invention will be illustrated below with reference to FIGS. 6 and 7. FIGS. 6 and 7 are each a plan view and a cross sectional view similar to FIGS. 2 and 3, except that an electro-optic device in this embodiment further comprises a shield layer 400.

With reference to FIGS. 6 and 7, the electro-optic device according to the second embodiment further can include the shield layer 400 between the data line 6a and the pixel electrode 9a. With reference to FIG. 6, the shield layer 400 is arranged in strip along the data line 6a with a width somewhat broader than that of the data line 6a when viewed from above. An electric source for supplying a fixed potential or wiring connected to the electric source is connected to an end (not shown) of the strip shield layer 400 to make the shield layer 400 to have a fixed potential.

By including the shield layer 400, the multilayer structure on the TFT array substrate 10 has an increased number of layers. In the resulting structure, the third interlayer insulator 43 in the first embodiment is divided into two layers, a fourth interlayer insulator 431 and a fifth interlayer insulator 432 in the second embodiment. These fourth interlayer insulator 431 and the fifth interlayer insulator 432 each have a relative dielectric constant lower than that of the dielectric film 75 of the storage capacitance 70.

According to the electro-optic device of the second embodiment, the presence of the shield layer 400 itself can considerably avoid the influence of the parasitic capacitance formed between the pixel electrode 9a and the data line 6a.

In addition to the aforementioned feature, the fourth interlayer insulator 431 and the fifth interlayer insulator 432 according to the second embodiment each have a relative dielectric constant lower than that of the dielectric film 75. Thus, the level of a parasitic capacitance formed between the pixel electrode 9a and the shield layer 400 or one between the shield layer 400 and the data line 6a can be minimized. Thus, the potential variations in the pixel electrode 9a caused by energization of the data line 6a cannot significantly occur according to the second embodiment. The electro-optic device according to the second embodiment can therefore display further higher-quality images than that according to the first embodiment.

In the second embodiment, it is more preferred that the fifth interlayer insulator 432 has a relative dielectric constant lower than that of the fourth interlayer insulator 431. In this case, the potential variations of the shield layer can be reduced, and the potential variations in the pixel electrode 9a can be significantly minimized. According to this embodiment, therefore, the formation of irregular display along the data lines 6a can be more effectively prevented, which is a main object of the present invention.

Figure 8:
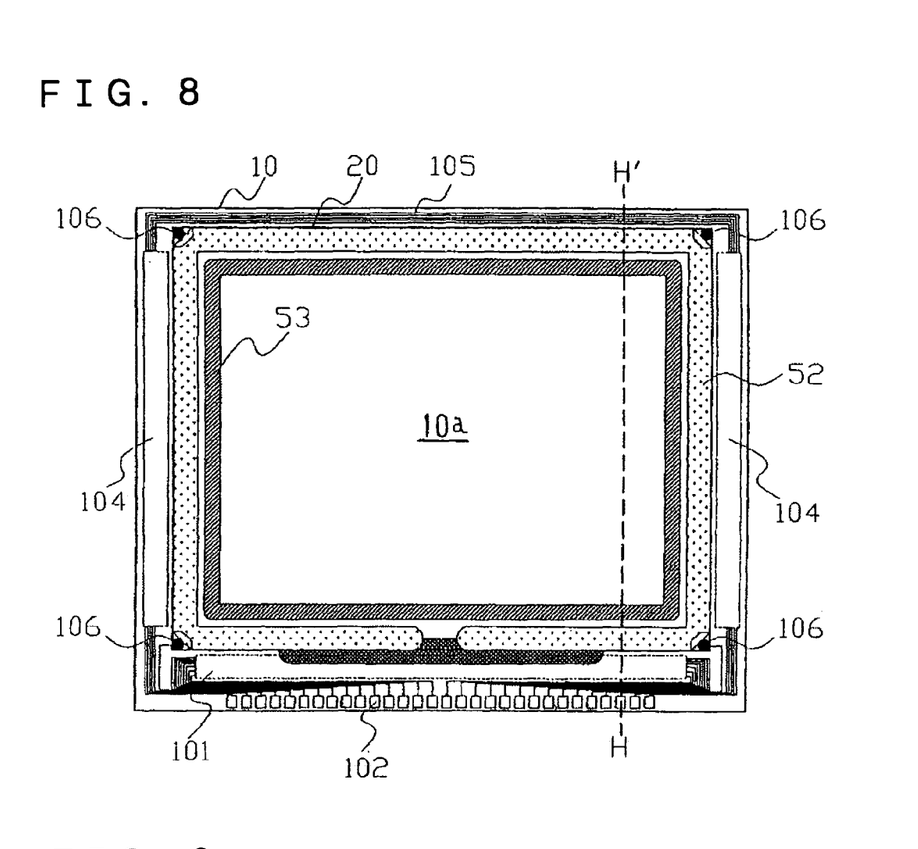
FIG. 8 is a plan view, when viewed from a counter substrate, of a TFT array substrate together with individual components arranged thereon.

The overall configuration of the electro-optic device according to the present embodiment will be illustrated below with reference to FIGS. 8 and 9. FIG. 8 is a plan view, when viewed from a counter substrate 20, of a TFT array substrate together with individual components arranged thereon, and FIG. 9 is a cross sectional view taken along line H–H' in FIG. 8.

Figure 9:
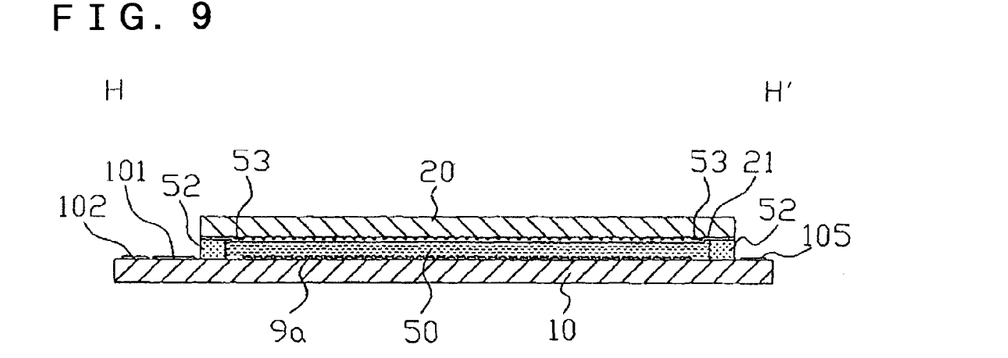
FIG. 9 is a cross sectional view taken along line H–H' in FIG. 8.

With reference to FIGS. 8 and 9, the electro-optic device according to the present embodiment includes a TFT array substrate 10 and the counter substrate 20 arranged so as to face each other. A liquid crystal layer 50 is encapsulated between the TFT array substrate 10 and the counter substrate 20. The TFT array substrate 10 and the counter substrate 20 are bonded with each other by a sealant 52 arranged in a sealing region on the periphery of an image display area 10a.

The sealant 52 serves to bond the two substrates, and includes, for example, an UV-curable resin or a thermosetting resin and has been cured, for example, by ultraviolet rays or heat. When the electro-optic device of the present embodiment is applied to a small-sized liquid crystal device for displaying enlarged images as in a projector, the sealant 52 also includes a gap member (spacer), such as glass fibers or glass beads so as to set the distance between the two substrates (gap between the substrates) at a predetermined level. When the electro-optic device is applied to a large-sized liquid crystal device for one to one projection such as a liquid crystal display or liquid crystal television, the gap member may be contained in the liquid crystal layer 50.

On the outer peripheral region of the sealant 52, a data line driving circuit 101 and an outer circuit junction terminal 102 are arranged along one side of the TFT array substrate 10, and scanning line driving circuits 104 are arranged along two sides adjacent to the side. The data line driving circuit 101 drives a data line 6a by supplying a picture signal to the data line 6a in predetermined timing, and the scanning line driving circuit 104 drives a scanning line 3a by supplying a scanning signal to the scanning line 3a in predetermined timing.

When delay of the scanning signals supplied to the scanning line 3a is not to be considered, the scanning line driving circuit 104 can be arranged on only one side. The data line driving circuit 101 may be arranged on both sides along the sides of the image display area 10a.

Plural wirings 105 are arranged on the other one side of the TFT array substrate 10. The wirings 105 serve to connect the two scanning line driving circuits 104 arranged on both sides of the image display area 10a.

In addition, a conduction member 106 is arranged on at least one of corners of the counter substrate 20. The conduction member 106 serves to establish electrical continuity between the TFT array substrate 10 and the counter substrate 20.

With reference to FIG. 9, an alignment layer is arranged on the pixel electrode 9a carrying the TFT for pixel switching and wirings, such as scan lines and data lines on the TFT array substrate 10. Another alignment layer is arranged on the uppermost layer of the counter substrate 20, in addition to the counter electrode 21. The liquid crystal layer 50 comprises a liquid crystal containing one or plural types of nematic liquid crystals and exhibits certain orientation between the pair of alignment layers.

The electro-optic device may further include, for example, a sampling circuit for applying picture signals to plural data lines 6a in predetermined timing, a precharge circuit for supplying precharge signals to plural data lines 6a at a predetermined voltage level prior to the picture signals, respectively, and an inspection circuit for checking the quality and defects of the electro-optic device during production or shipping in addition to these data line driving circuit 101, scanning line driving circuit 104 and other components on the TFT array substrate 10.

In each embodiment mentioned above, instead of providing the data line driving circuit 101 and the scanning line driving circuit 104 on the TFT array substrate 10, for example, these circuits may be electrically and mechanically connected to a driving LSI mounted in a TAB (tape automated bonding supporting substrate) via an anisotropic conductive film arranged in a peripheral section of the TFT array substrate 10. On a side of the counter substrate 20 on which projected light is incident and a side of the TFT array substrate 10 from which light is emitted, polarization films, retardation films, and/or polarization devices are arranged in predetermined directions according to operational modes, such as a twisted nematic (TN) mode, a vertically aligned (VA) mode, polymer dispersed liquid crystal (PDLC) mode, and types, such as a normally white mode and a normally black mode.

Figure 10:
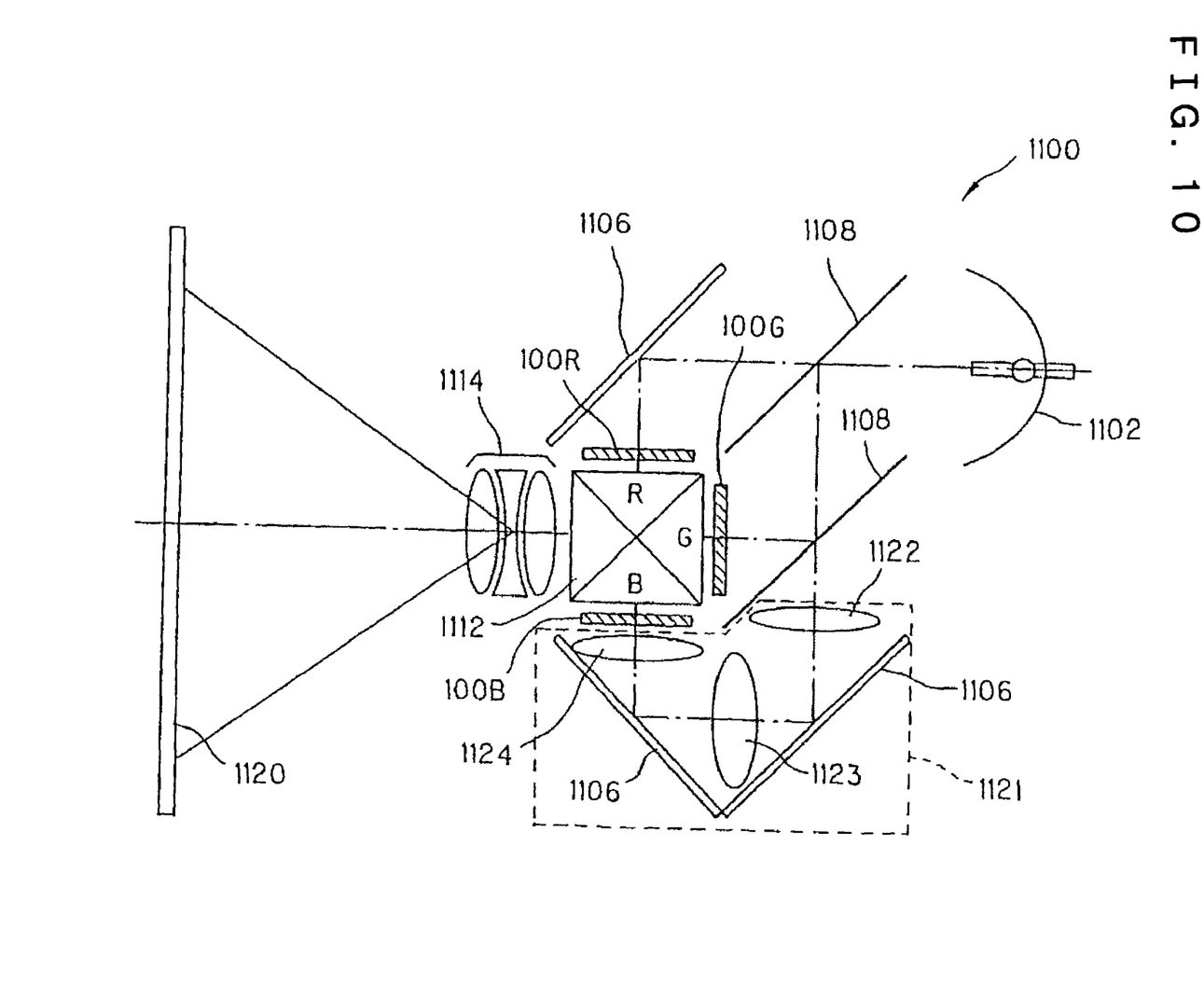
FIG. 10 is a schematic cross sectional view of a color liquid crystal projector as an example of a projective color display device according to an embodiment of the electronic equipment of the present invention.

The overall configuration and specifically its optical configuration of a projective color display device will be illustrated below. The projective color display device is an example of electronic equipment using the aforementioned electro-optic device as a light valve. FIG. 10 is a schematic sectional view of the projective color display device.

With reference to FIG. 10, a liquid-crystal projector 1100 as an example of the projective color display device of the present embodiment includes three liquid-crystal modules, each including the electrooptic device having the driving circuit on the TFT array substrate. The liquid-crystal projector 1100 thus includes light valves 100R, 100G, and 100B for RGB colors. When light is emitted from a lamp unit 1102 as a white light source, such as a metal halide lamp in the liquid-crystal projector 1100, the light is separated into the red, green, and blue light beams corresponding to three RGB primary color beams through three mirrors 1106 and two dichroic mirrors 1108, and the three color light beams are then guided to respective light valves 100R, 100G, and 100B. The blue color beam travels along a path longer than those for the red and green color beams, and to prevent loss, the blue color beam is guided through a relay lens system 1121 including an incident lens 1122, a relay lens 1123, and an exit lens 1124. The red, green, and blue light beams corresponding to the three primary colors and being respectively color-modulated by the light valves 100R, 100G, and 100B are synthesized into the three color images on a dichroic prism 1112, and a synthesized color image is then projected by a projection lens 1114 onto a screen 1120.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. An electro-optic device, comprising:
 a substrate;
 data lines disposed on the substrate and extending in a set direction;
 scanning lines disposed on the substrate and extending in a direction perpendicular to the data lines; and
 pixel electrodes and thin film transistors disposed on the substrate and each being arranged so as to correspond to the regions of intersection between the data lines and the scanning lines;

a storage capacitance having pixel-potential capacitive electrodes coupled to the pixel electrodes and thin film transistors;

fixed-potential capacitive electrodes facing the pixel-potential capacitive electrodes;

a dielectric film arranged between the pixel-potential capacitive electrodes and the fixed-potential capacitive electrodes;

a first interlayer insulator arranged between the fixed-potential capacitive electrodes and the scanning lines;

a second interlayer insulator arranged between the data lines and the fixed-potential capacitive electrodes;

a shield layer having a fixed potential and being arranged between the pixel electrodes and the data lines; and a third interlayer insulator arranged between the pixel electrodes and the data lines, the third interlayer insulator including:

a fourth interlayer insulator arranged between the pixel electrodes and the shield layer;

a fifth interlayer insulator arranged between the shield layer and the data lines, at least one of the fourth interlayer insulator and the fifth interlayer insulator having a relative dielectric constant lower than that of the dielectric film, the fifth interlayer insulator having a relative dielectric constant lower than that of the fourth interlayer insulator; and at least one of the first interlayer insulator, the second interlayer insulator, and the third interlayer insulator having a relative dielectric constant lower than that of the dielectric film constituting the storage capacitance.

2. The electro-optic device according to claim 1, the third interlayer insulator having a relative dielectric constant lower than those of the first interlayer insulator and the second interlayer insulator.

3. The electro-optic device according to claim 1, at least one of the first interlayer insulator, the second interlayer insulator, and the third interlayer insulator having a relative dielectric constant less than 3.9.

4. The electro-optic device according to claim 1, at least one of the first interlayer insulator, the second interlayer insulator, and the third interlayer insulator having a thickness of 800 nm or more.

5. The electro-optic device according to claim 1, at least one of the first interlayer insulator, the second interlayer insulator, and the third interlayer insulator including an inorganic material.

6. The electro-optic device according to claim 5, the inorganic material comprising at least one of SiOF and amorphous carbon.

7. The electro-optic device according to claim 1, a semiconductor layer constituting the thin film transistors comprising a low temperature polycrystalline silicon, and at least one of the first interlayer insulator, the second interlayer insulator, and the third interlayer insulator comprising an organic material.

8. The electro-optic device according to claim 1, the pixel electrodes being at least partially overlapping with the data lines when viewed from above.

9. The electro-optic device according to claim 1, the electro-optic device comprising the substrate; a semiconductor layer constituting the thin film transistors; the scanning lines arranged on the semiconductor layer and including gate electrodes of the thin film transistors; the pixel-potential capacitive electrodes; the dielectric film; the fixed-potential capacitive electrodes; the data lines; and the pixel electrodes, each of which are arranged on the substrate in this order.

10. The electro-optic device according to claim 1, the fixed-potential capacitive electrodes constituting a part of capacitive lines arranged along the scanning lines.

11. Electronic equipment comprising the electro-optic device according to claim 1.

* * * * *